March 31, 1959 G. KLEMT 2,879,693
MEANS FOR ADJUSTING INTERCHANGEABLE PARTS OF
PHOTOGRAPHIC OBJECTIVES
Filed Jan. 7, 1954
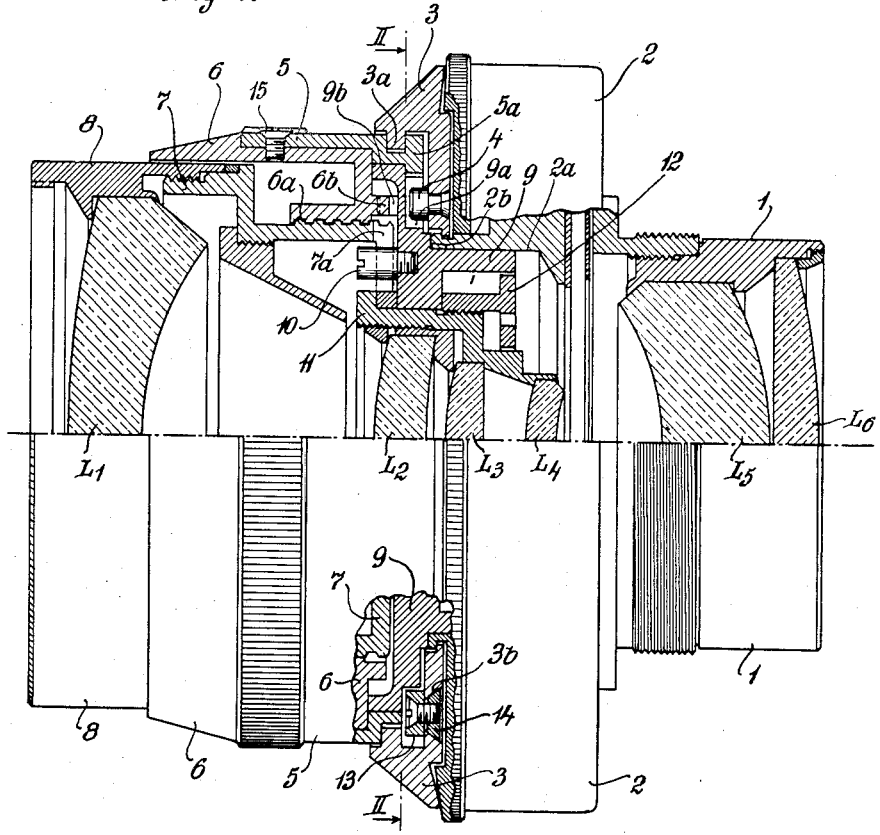
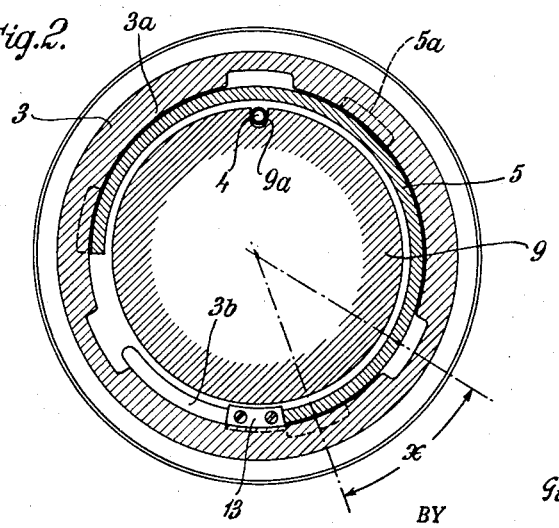
INVENTOR:
Günter Klemt
BY Karl F. Ross
AGENT No. 2,879,693

Patented Mar. 31, 1959

2,879,693

MEANS FOR ADJUSTING INTERCHANGEABLE PARTS OF PHOTOGRAPHIC OBJECTIVES

Günter Klemt, Kreuznach, Rhineland, Germany, assignor to Jos. Schneider & Co., Kreuznach, Rhineland, Germany Application January 7, 1954, Serial No. 402,679

Claims priority, application Germany January 10, 1953

5 Claims. (Cl. 88—57)

My present invention relates to photographic objectives having interchangeable components for the purpose of changing the angle of view.

In photographic apparatus it is often desirable to vary the image scale so as to be able to produce either a small-scale image of a relatively wide sector (panoramic view) or a large-scale image of a relatively narrow sector (detail view) without changing location. This can be readily accomplished by substituting either a wide-angle objective of small focal length or a telephoto objective of large focal length for the standard objective originally provided in the camera.

Such substitution is readily feasible if the camera is equipped with a shutter detached from the objective, e.g. a slitted focal-plane blind or a shutter of the central-aperture type positioned immediately behind the last lens. These types of shutters, however, are used only comparatively rarely, because of certain drawbacks (e.g. mechanical complications) well recognized in the art.

In the more usual standard objective, therefore, a shutter of the central-aperture type is positioned within the optical limits of the diaphragm space, thereby requiring substitution of lenses as well as shutters whenever objectives are to be interchanged in their entirety. The replacement of the shutter, however, involves certain mechanical difficulties, particularly in the case of modern cameras equipped with means for coupling the film feed with the shutter and for preventing double exposure. Also, the substitution of objectives in such case results in spoilage of a portion of the film, unless an auxiliary light seal back of the shutter is provided or the exchange is carried out in a dark room.

A mechanically simple and economically advantageous solution of the above problem resides in the provision of objectives with fixed rear member and interchangeable front members back and ahead of the shutter respectively. In this case, the rear lens assembly and the shutter may be common to a set of three objectives (normal, telephoto and wide-angle), so that the number of extra parts is reduced to a minimum. These extra parts may, in fact, be acquired by the user at his leisure, the camera being normally equipped with a standard objective whose distance calibration has been checked by the manufacturer against actual performance.

Because of unavoidable differences in the thickness of components and/or in the character of the lens glass, some refocusing of each exchange objective may be required to compensate for manufacturing tolerances. If the additional objectives are supplied along with the camera, they may, of course, be properly calibrated by the manufacturer; if, however, they are purchased subsequently, the user may have great difficulties in making the necessary adjustments to compensate for tolerances in the detachable component ahead of the shutter.

The object of my present invention, accordingly, is to provide means for automatically effecting the adjustment of interchangeable objective components.

According to one of its aspects, my invention resides in initially equipping the camera with a main objective having a fixed rear portion (back of the shutter) and a detachable front portion (ahead of the shutter), determining the extent of the compensation necessary for the aforementioned tolerances, if any, ahead of the shutter by replacing this front portion with a corresponding component of an exchange objective (e.g. of the telephoto or the wide-angle type) adapted to be used with the camera and observing the focusing action of the so modified objective with the aid of a collimator or the like, rotating a part of the substituted front component with respect to the rear portion of the objective to vary its focal length until correct focusing is obtained, and indicating the extent of such displacement on the fixed objective portion, whereby the same setting may be subsequently utilized for the proper tolerance compensating adjustment of an auxiliary (e.g. telephoto or wide-angle) objective constituted by the rear portion of the main objective and by an exchange component substituted for the main-objective front portion originally provided in the camera.

The true optically effective lengths of a number of series-produced objectives will, generally, be grouped within the tolerance range about a mean value corresponding to the design length. The compensating adjustment may, for convenience, be made by the rotation of a control member threadedly engaging an axially movable lens mount of the standard or prototype exchange component attached to the objective. In such case, the extent and the sense of the adjustment may be read on a scale suitably graduated, for example, in degrees or in arbitrary units divided into groups and subgroups. When the front portion of the main objective is replaced by the user with an after-acquired exchange attachment to provide an auxiliary objective of different focal length, the rotatable part of the new front portion is moved to the correct angular position indicated on the fixed rear portion whereby, as a result of the relative rotation between this part and the axially movable lens mount which is held in an invariable angular position, the front portion is refocused to compensate for the factory-determined tolerances of the overall system introduced by the conversion into a telephoto or wide-angle objective.

According to another aspect of my invention, the angular position of the rotatable front part is indicated by a mechanical locator in the form of an adjustable seat or stop on the fixed objective portion against which a control element of the exchange attachment comes to rest when the two portions are joined together. The control element is preferably a coupling member, advantageously of the bayonet type, which threadedly engages an axially movable lens mount forming part of the front portion of the objective, this lens mount being held against rotation by suitable detent means. One or more additional lenses may be supported on a stationary lens mount also forming part of the front portion of the objective, the lenses of the two mounts thus defining a variable air space serving to change the focal length of that portion.

The invention will be better understood from the following detailed description of a representative embodiment, reference being had to the accompanying drawing in which:

Fig. 1 shows, partly in elevation and partly in longitudinal section, an optical system according to the invention; and Fig. 2 is a section taken substantially on the line II—II of Fig. 1 but drawn to a smaller scale.

The objective shown in the drawing consists, essentially, of a front portion comprising lenses $L_1$, $L_2$, $L_3$, $L_4$ and a rear portion comprising lenses $L_5$, $L_6$. This system may be considered an exchange objective of a camera (not shown) arrived at by replacing the front portion of a conventional normal-view objective, having fixedly spaced lenses, with the assembly $L_1$–$L_4$ of different focal length.

A cylindrical lens mount 1, Fig. 1, carries the lenses $L_5$, $L_6$ and is positioned at the rear of the objective, i.e. at the side of the shorter light rays. This lens mount is secured to a central-aperture-type shutter 2 of conventional design (not illustrated in detail) having a mounting cylinder 2a with contact surface 2b for the detachable objective portion. Also fixed to the shutter is the frontal plate 3 having bayonet segments 3a and a flared, arcuate slot 3b for a purpose presently to be described; this plate further carries a forwardly projecting detent stud 4. At 5 there is shown a bayonet ring with crenellations 5a adapted to enter the slots between segments 3a of plate 3.

A control ring 6, joined to bayonet ring 5 by a screw 15, matingly engages a lens barrel 7 by means of screw threads 6a. Lens $L_1$ is held in an axially movable movable mount 8 secured to barrel 7. A guide cylinder 9 slidably fits inside cylinder 2a; cylinder 9 is provided with a detent slot 9a, adapted to receive the stud 4, and with a stop screw 9b co-operating with a projection 6b on ring 6. A guiding screw 10 projects forwardly from cylinder 9 and enters a slot 7a in an annular flange portion of barrel 7. A stationary lens mount 11, supporting the lenses $L_2$, $L_3$ and $L_4$, is secured to cylinder 9 by means of a locking ring 12 engaging the threaded rear extremity of the mount. An abutment plate 13 is adjustably attached to frontal plate 3 by means of screws connecting it with a wedge-shaped shoe 14 on slot 3b.

When a series-produced principal objective comprising a detachable front portion (not shown) and a fixed rear portion $L_5$, $L_6$ is to be factory-adjusted in the previously indicated maner, it is focused on infinity and, after replacement of its front portion with the assembly $L_1$–$L_4$ (representing the forward component of a tested prototype of an exchange objective), is tested with a collimator for sharpness of focus. If this test, carried out in a limiting position of the bayonet coupling in which ring 5 abuts the plate 13, indicates the necessity of further adjustment, abutment plate 13 is loosened and the ring 6 is rotated to displace lens $L_1$, by means of screw threads 6a, until a sharp image is obtained. The angular distance x of this position of adjustment from a reference position, e.g. from the position of register between the crenellations 5a and respective bayonet slots defined by segments 3a, is noted and is subsequently transferred to the abutment plate 13 as illustrated in Fig. 2. When, subsequently, the forward section 5—12 of an auxiliary objective is attached by the user to the rear section 1—3, the angular position of all the parts of the forward section except members 5 and 6 will be invariably determined by the co-operation of stud 4 with slot 9a as well as by the mating of stud 10 with slot 7a, whereas the rotatable members 5 and 6 will occupy an angular position established by the engagement of one of the crenellations 5a with abutment plate 13 as shown in Fig. 2. The position of control ring 5 so determined will, in turn, fix the axial position of lens support 7, 8 and, hence, of lens $L_1$ through the intermediary of screw thread 6a. The axial position of lens mount 11 and, thereby, of lenses $L_2$, $L_3$, $L_4$ is, of course, invariably established by the contact between cylinder 9 and surface 2b against which the cylinder is firmly urged by the bayonet coupling 3a, 5a.

The presence of stop screw 9b in conjunction with projection 6b limits relative rotation between parts 9 and 6 and, thereby, prevents the lens support 7, 8 from being driven out of engagement with the remainder of the detachable front port by the turning of ring 6.

It will thus be seen that my invention enables the immediate compensation of tolerances which would impair the focusing action of, say, a telephoto or a wide-angle objective obtained by the replacement of a detachable portion of a properly adjusted normal-view objective. It will also be understood that it is possible, in lieu of the automatic adjustment afforded by plate 13, to provide suitable markings for visual adjustment on the relatively rotatable coupling members 3, 5 to indicate the extent of compensating movement required. In that case one might, of course, provide different markings for the wide-angle and the telephoto objective, both obtained by collimator tests conducted at the factory with prototypes of the respective objectives. For general purposes, however, a single (preferably automatic) adjustment as hereinabove described will be satisfactory.

The invention is, accordingly, not limited to the specific embodiment herein disclosed but may be realized in numerous modifications and adaptations without departing from the spirit and scope of the appended claims. In the construction of these claims, it should be remembered that the objective shown in the drawing may, obviously, be bodily displaceable within the camera for focusing in the usual manner and that, therefore, expressions such as "fixed objective portion" are to be construed with this qualification in mind.

I claim:
1. In an objective system, in combination, a fixed objective portion and a detachable objective portion, said detachable portion comprising a front and a rear lens mount axially displaceable with respect to each other, a common support for said lens mounts and mechanism including a control member rotatable relatively to said support for varying the axial spacing of said lens mounts, said detachable portion in conjunction with said fixed portion constituting an objective having a focal length variable by relative displacement of said lens mounts; connector means for removably securing said detachable portion of said fixed portion, said connector means including detent means for substantially immobilizing said support with respect to said fixed portion in an invariable relative angular position upon the joining of said detachable portion thereto; position-locating means on said fixed portion; and indicator means on said control member co-operating with said locating means for determining independently of said detent means a relative angular position of said control member corresponding to a predetermined focal adjustment for said lens mounts.

2. The combination according to claim 1 wherein said rear lens mount is axially fixed on said support.

3. The combination according to claim 1, wherein said indicator means comprises a projection positioned on said control member for rotation therewith, said locating means comprising stop means on said fixed portion positioned in the path of rotation of said projection, thereby limiting relative rotation of said control member and said support.

4. The combination according to claim 3, wherein said connector means comprise a female bayonet element on said fixed portion and a male bayonet element on said control member, said projection constituting a crenellation of said male bayonet element, said stop means being secured to said female bayonet element.

5. The combination according to claim 3, wherein said stop means is adjustably mounted on said fixed portion.

References Cited in the file of this patent

UNITED STATES PATENTS

| | | |
|---|---|---|
| 1,394,078 | Fredrick | Oct. 18, 1921 |
| 2,136,149 | Nuchterlein | Nov. 8, 1938 |
| 2,184,018 | Ort | Dec. 19, 1939 |
| 2,245,241 | Wood | June 10, 1941 |
| 2,263,024 | Wood | Nov. 18, 1941 |
| 2,371,524 | Kals | Mar. 13, 1945 |
| 2,649,024 | Goldhammer | Aug. 18, 1953 |